Figure 1:
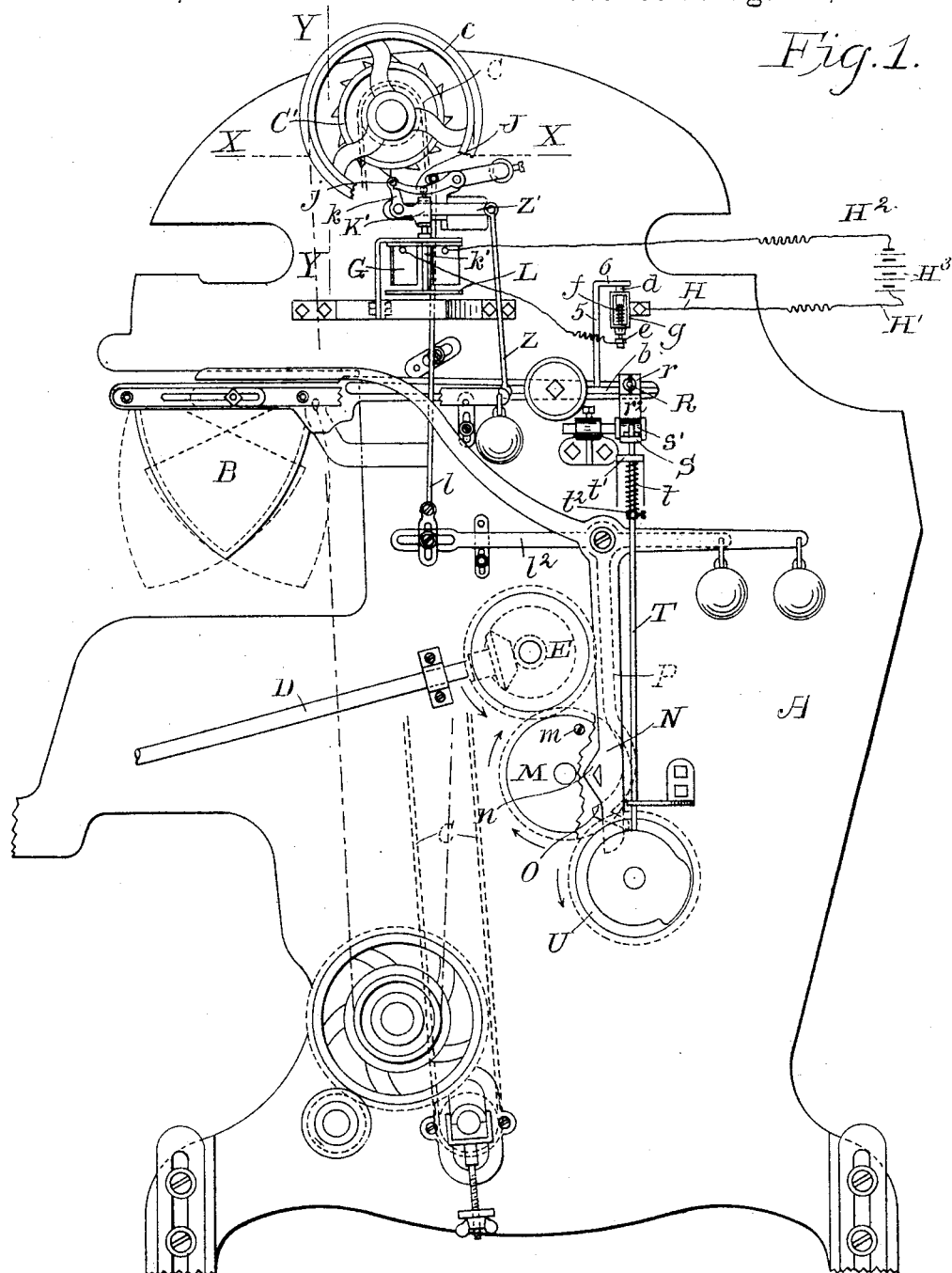

(No Model.) 2 Sheets—Sheet 1.

J. HEARN.
MECHANISM FOR FEEDING CARDING ENGINES.

No. 587,815. Patented Aug. 10, 1897.

Witnesses:
J. W. Fisher
Grace T. Hany

Inventor
John Hearn
by Ward & Cameron
Attorneys

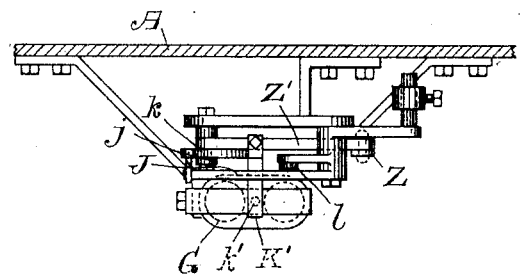
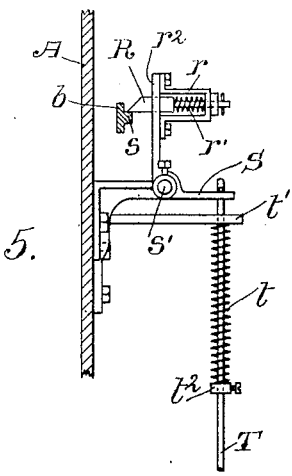
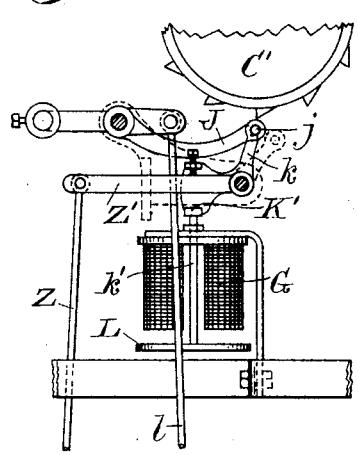
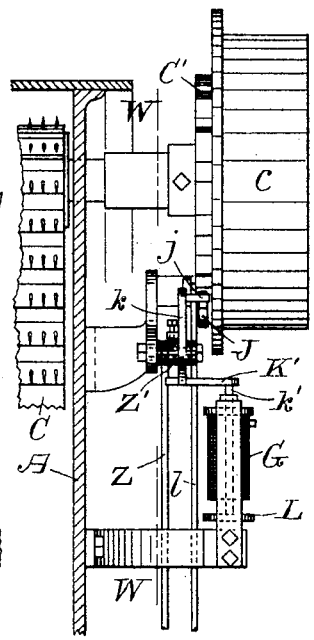

United States Patent Office.

JOHN HEARN, OF HUDSON, NEW YORK.

MECHANISM FOR FEEDING CARDING-ENGINES.

SPECIFICATION forming part of Letters Patent No. 587,815, dated August 10, 1897.

Application filed February 23, 1897. Serial No. 624,509. (No model.)

*To all whom it may concern:*

Be it known that I, JOHN HEARN, a citizen of the United States, residing at Hudson, county of Columbia, State of New York, have invented an Improvement in Mechanism for Feeding Carding-Engines, of which the following is a specification.

My invention relates to improvements in carding-engines; and the object of my invention is to provide an automatic device for stopping the feeding-apron abruptly and immediately upon the scale becoming balanced. I accomplish this object by means of the mechanism illustrated in the accompanying drawings, in which—

Figure 1 is a side elevation. Fig. 2 is a section along the lines X X on Fig. 1. Fig. 3 is a section along the lines Y Y on Fig. 1. Fig. 4 is a section along the lines W W on Fig. 3, and Fig. 5 is a detail view of the device for steadying the scale-beam.

Similar letters and figures refer to similar parts throughout the several views.

The frame A of a carding-engine is provided with scales B of the usual and well-known construction, the feeding-apron C mounted in the ordinary manner, and the mechanism operated by power applied to the shaft D putting in motion the gear E, all in the usual and well-known manner.

Heretofore the ratchet connected with the pulley $c$, carrying the feed-apron C, has been stopped by means of a dog set in operation by the rod Z, attached to the beam of the scale. The objection to that device is that its operation is too slow. The action of the scale-beam upon the lever Z', to which the rod Z is attached, requires a certain quite appreciable period of time to elapse from the moment that the scale is balanced before the feeding mechanism is stopped. For that reason after the scale has been balanced, the feed-apron not being stopped abruptly at the time the scale is balanced, a certain additional quantity of material is delivered to the scale. It is to prevent the addition of any of the material after the scale has been balanced that I have provided my automatic stopping device, which I now proceed to describe.

To one of the scale-beams $b$ I secure in any suitable manner an arm 5, carrying a horizontal strip 6, arranged to rest upon the end of a plunger $d$, the end of said plunger carrying a contact pin or plate $e$, which pin or plate is connected by wire to the solenoid G. About the non-conducting plunger $d$ I place a spiral spring $f$, housed within a metallic casing $g$, connected with a wire H, which communicates with one pole H' of a generator $H^3$. The operation of this device, which is suitably mounted to the frame A, or in any convenient manner, when the beam $b$ of the scale is raised, which is done as the scale balances, the strip 6 releases the spring $f$, causes the plunger $d$ to rise and the contact-plate $e$ to come in contact with the metallic casing $g$, making an electrical connection between the solenoid G and the generator $H^3$.

On the pulley $c$ a ratchet C' is mounted, and a dog J is pivoted to the frame adapted to engage with said ratchet and stop the revolution of the apron. The dog J is held away from the ratchet by means of a pin $j$ in the end of a bell-crank lever $k$.

Pivoted to the end K' of the bell-crank lever $k$ I arrange a rod $k'$, carrying a contact-plate L, the rod passing between the adjacent magnets of the solenoid G, the plate L extending below said solenoid, one of the magnets being attached by wire to the plate $e$, as heretofore described, the other attached to one pole $H^2$ of the generator. When the contact has been made between the plate $e$ and the metallic casing $g$, making connection between the battery and the solenoid, the solenoid, becoming charged, attracts the plate L and forces the pin $j$ from contact with the dog, as shown by dotted lines in Fig. 4, when the dog will immediately come in contact with the ratchet, the dog being weighted. Thus with the first motion of the balancing of the scale, which necessarily is attended with the raising of the scale-beam $b$, the dog is engaged with the ratchet, and the feeding-apron is abruptly stopped, preventing further deposit in the scale.

The scale is opened in the usual manner. The pin $m$ on the gear M, which comes in contact with the projection $n$ on the lever N and opens the scale, after passing the projection $n$ on said lever comes in contact with the convex portion O on the lever P, which connects with the weighted lever $l^2$, and, pressing against said lever, draws downward the rod $l$, and consequently the dog J, thus liberating the ratchet C', the dog being held away from the ratchet by means of the pin $j$.

When the scale is closed, the scale-beam $b$, which carries the arm 5 and strip 6, resting upon the end of the plunger $d$, might have a tendency to rebound upon said plunger, and thus make connection between the plate $e$ and the casing $g$. To prevent this, I arrange a steadying device, (shown in detail in Fig. 5,) which consists in a bolt R, suitably mounted within a casing $r$ and provided with a spring $r'$, tending to cause the bolt to protrude through the plate $r^2$ and to engage with a lug $s$ on the arm $b$. The plate $r^2$ is pivoted at $s'$ and is provided with a lower rectangular projection S, which in turn is connected with the rod T, which carries a spring $t$, adapted to rest against a plate $t'$ at its upper end and a collar $t^2$ on the rod T at its lower end, the operation of the spring $t$ tending to force the rod T downward, and therefore the bolt R away from the lug $s$. The end of the rod T rests upon a cam-shaped portion of the gear U. The configuration of said cam-shaped portion of the gear U is such that the rod T is held projected at the time that the scale is being closed and until the scale has become quiet. The spring $t$, operating upon the projection S, removes the bolt R, in contact with the scale-beam, which is then free for the opening operation.

What I claim as my invention, and desire to secure by Letters Patent, is—

1. In a carding-engine, an automatic feeding device consisting of a feeding-apron suitably mounted, scales provided with scale-beams, a dog, a ratchet on the pulley carrying said feeding-apron, a plunger suitably mounted carrying a contact pin or plate, a solenoid, a metallic strip or casing, a battery or generator having one of its poles connected with said metallic strip or casing, a device for holding said dog away from said ratchet, so arranged that when the solenoid becomes charged, the dog will be released and come in contact with the ratchet, substantially as described and for the purpose set forth.

2. In an automatic device for stopping the feeding mechanism of a carding-engine, a dog, a ratchet on the pulley carrying the feeding-apron, a feeding-apron, a device for holding the dog away from said ratchet, a solenoid, said device adapted to release said dog when the solenoid becomes charged, a means for charging the solenoid by the operation of one of the scale-beams, when the scale is balanced, substantially as described and for the purpose set forth.

3. In a device for regulating the feed of a carding-engine, a scale, a means for operating the same, a feeding-apron suitably mounted, a steadying device consisting of a latch, a scale-operating arm or beam, a pivoted plate connected with said latch, a projection thereon, a rod connected with said projection, a spring on said rod, a cam-shaped projection on a gear, said rod resting on said cam-shaped projection, so arranged that the latch is in connection with the scale-beam at the time the scale is being closed and until the scale has become quiet and then released therefrom, substantially as described and for the purpose set forth.

JOHN HEARN.

Witnesses:
WM. SEYMOUR,
JORDAN PHILIP.